Dec. 26, 1933.  H. A. UNKE  1,941,235

THREAD PROTECTOR

Filed May 29, 1931

Inventor
Herman A. Unke
Kwis Hudson & Kent
attys

Patented Dec. 26, 1933

1,941,235

UNITED STATES PATENT OFFICE 1,941,235

THREAD PROTECTOR

Herman A. Unke, Cleveland, Ohio

Application May 29, 1931. Serial No. 540,974

1 Claim. (Cl. 137—91)

This invention relates to devices for protecting the threaded portions of elements, such as pipes or tubes, during shipment or other operations requiring handling thereof, and as its principal object aims to provide an improved device of this kind.

It is also an object of this invention to provide a protecting device of the kind mentioned which is of simplified form and can be cheaply manufactured; which will afford adequate protection for the threads of the element to which it is applied without danger of being jarred or shaken loose; and which can be easily applied to the threaded portion by a simple sliding movement in the direction of the longitudinal axis of the element, and can be readily removed from the threaded portion either by a simple axial movement, or by combined axial and twisting movement.

Another object of this invention is to provide a thread protector of the type having a sleeve and a non-metallic thread engaging liner adapted to seal the threads of a pipe or other threaded member to prevent the coating of the threads when a coating material is applied to the pipe or member, and embodying novel means for preventing separation of the sleeve and liner.

This application is filed as a continuation in part of my copending application Serial No. 516,388, filed February 17, 1931.

Other objects and advantages of the invention will be apparent from the following description when taken in conjunction with the accompanying sheet of drawing, in which.

Figure 2:
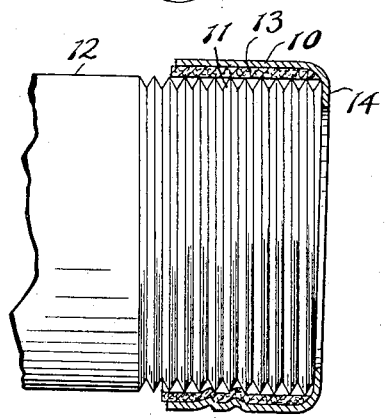
Fig. 2 is a similar elevational view showing the protector in section.

In the drawing, to which detailed reference will now be made, I have illustrated the preferred form of my thread protector, as a means for disclosing my invention, but it will be understood, of course, that my invention is not to be considered as limited to the particular arrangement of structure illustrated and described.

As herein illustrated my protecting device comprises a metallic sleeve 10 which is adapted to surround the threads 11 of an element, such as the pipe 12, and a coaxial non-metallic sleeve 13 which forms a liner for the metallic sleeve.

The metallic sleeve 10 is preferably formed by a suitable drawing or stamping operation, and may be provided with an apertured end wall portion 14 which engages the end of the threaded element when the protector is assembled thereon. The non-metallic sleeve or liner 13 is formed of any suitable material, such as blotter paper or the like, which in the completed device, engages the threads 11 of the element for the purpose of preventing the entry or retention of enamel, or other foreign material, between the threads, and for retaining the protector in place with the metal of the sleeve 10 out of engagement with the threads. Thus the non-metallic sleeve not only serves to retain the protector on the threaded portion of the element and to prevent foreign matter from entering and clogging the threads, but also prevents the metal wall of the sleeve 10 from contacting with and dulling the threads.

Figure 3:
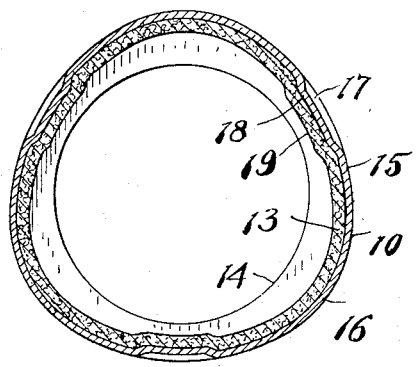
Fig. 3 is a transverse sectional view of the protector taken on line 3—3 of Fig. 1.
Figure 1:
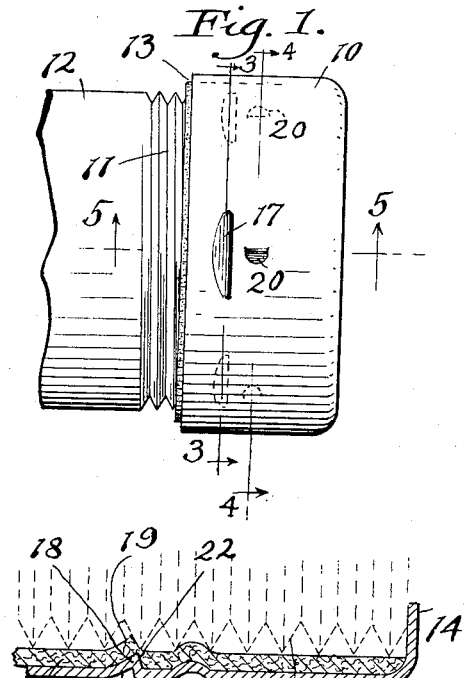
Figure 1 is an elevational view showing the protector of my invention applied to the threaded portion of an element.

To firmly press the non-metallic sleeve into engagement with the threads, so that the protector will be retained in place on the element, I make the metallic sleeve 10 of non-cylindrical form as clearly shown in Fig. 3 of the drawing. In this instance I have shown the metallic sleeve as being formed with peripherally spaced portions 15 thereof pressed or deflected inwardly so that these portions are at a shorter radial distance from the axis of the sleeve than the sections 16 of the sleeve which are located intermediate these portions. This non-cylindrical shape of the metallic sleeve causes the liner 13 to be pressed firmly against the threads at points corresponding with the inwardly pressed portions 15, so that the protector will not be readily jarred or shaken loose. Because of the non-cylindrical shape given the sleeve 10, the metal forming the wall of this sleeve will be somewhat resilient and when the protector is placed over the threaded portion of the element the metal sleeve will be deflected and will tend to assume a truly cylindrical shape. This deflection causes the metallic sleeve to resiliently press the liner against the threads with considerable force under the spaced portions 15, and to also press the liner against the threads intermediate the spaced portions.

For preventing separation of the metallic sleeve from its liner by axial movement therebetween, I have provided the metal sleeve with the peripherally spaced indentations 17 which are clearly shown in the drawing. These indentations are located at the inwardly deflected portions 15 and spaced from said non-circular end so as to leave a plain ring-like portion between the indentations and said non-circular end adapted to tightly press said liner into the threads throughout the circumference of said ring-like portion. The indentations 17 are formed by pressing some of the metal of the sleeve into the liner so as to provide an interengagement between the metal and the material of the liner. This interengagement effectively locks the sleeves together so that the metal sleeve will not slide off the liner when subjected to blows or jars, and so that in applying or removing the protector both sleeves can be applied or removed as a single operation, which is usually a simple axial movement relative to the threaded element. When the device is applied to the threaded portion of an element, such as the tube shown in Fig. 2, the lugs or material 18, which is displaced in forming the indentations 17, cause some of the material of the liner, in the form of the lugs 19, to be pressed into the grooves between the threads to assist in retaining the device in place.

Although the protector can usually be removed by a simple axial movement relative to the threaded element, in some cases it may be necessary or desirable to supplement the axial movement by a twisting movement of the protector as if to unscrew the same from the threads. I have found that when such a twisting or unscrewing movement is necessary or desirable to remove a protector, the lugs 18 frequently cut through or ride over the liner. This may result in a separation of the two sleeves and in the liner being retained on the threads after the metal sleeve has been removed.

Figure 4:
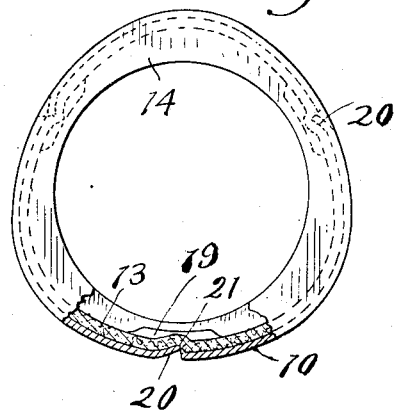
Fig. 4 is an end view of the protector with a portion thereof in section on line 4—4 of Fig. 1.

Therefore, to assist the lugs 18 in retaining the metal sleeve and liner in assembled relation, and to prevent relative movement between those parts, should a twisting movement be used in removing the protector, I provide the interlocking lugs or tangs 20. As shown in Fig. 4 of the drawing, these lugs are preferably spaced circumferentially of the metal sleeve to correspond with the spacing of the indentations 17, and may be formed by partially shearing tongue-like bodies of metal from the wall of the sleeve 10 and pressing the same substantially radially inwardly into the liner. It will be noted that the tangs thus formed extend in a circumferential direction and that their inwardly pressed free ends 21 have a barb-like effect which prevents relative rotation between the metal sleeve and the liner.

Figure 5:
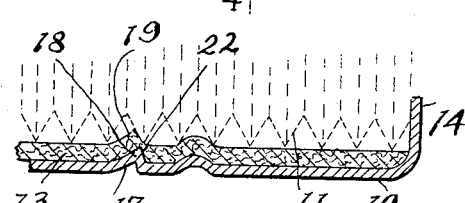
Fig. 5 is a detail sectional view, on an enlarged scale, taken on line 5—5 of Fig. 1.

The protector which I have described can be produced in any desired manner, but I prefer to make the device by initially constructing the metallic sleeve of cylindrical form, and then placing this cylindrical sleeve over the non-metallic sleeve or liner 13, while the latter is supported upon a suitable mandrel or die. With the sleeves in this assembled coaxial relation, the indentations 17 and the interlocking tangs 20 are formed by pressing lugs of metal inwardly from the metal sleeve, and mashing them into the paper, or other material of which the liner may be formed, by means of a suitable tool or die. At the same time that the indentations are formed, the portions 15 of the metallic sleeve may be pressed inwardly at circumferentially spaced points to give it the out-of-round or non-cylindrical cross-sectional shape shown in Fig. 3. It should be stated that in mashing the metal lugs 18 formed by the indentations 17, into the liner, some of the material of the latter is displaced inwardly into recesses in the surface of the mandrel to form the tapered barb-like lugs 19 on the inner surface of the liner. The formation of the metal lugs 18, while the non-metallic sleeve is backed up by the mandrel, causes the material of the liner to be slit or sheared adjacent each metal lug, as indicated at 22 in Fig. 5, and causes the material of the liner on the side of the slit which is most remote from the wall portion 14 to be deflected inwardly to form the tapered barb-like lugs 19. When the device is applied to the threaded portion of an element, the metal lugs 18 press the barb-like lugs 19 of the lining material, into the grooves between the threads as explained above.

It will now be readily understood that I have devised a thread protector of simplified form which can be cheaply manufactured, and which can be easily and quickly applied to a threaded portion by a simple sliding movement axially of the element, and may be removed with facility by a combined axial and twisting movement without separation of the metal sleeve from the liner. Moreover, it will be seen that the out-of-round characteristic of the metal sleeve causes the non-metallic sleeve to be resiliently and firmly pressed into engagement with the threads throughout the periphery of the initially non-circular end portion, so as to shield the latter against the entry of a coating or other foreign material, and so that there will be little danger of the device being jarred or shaken loose. The indentations and the tangs of the metal sleeve afford interengagement with the liner to prevent separation of these two elements by either axial or angular movement. Additionally, the lugs formed by the indentations assist in securing the device in place by causing the material of the liner to be pressed into the grooves between the threads at the circumferentially spaced points where the indentations are located.

While I have illustrated and described the device of my invention in a detailed manner, it should be understood, however, that I do not intend to limit myself to the precise details and arrangements of parts illustrated and described, but regard my invention as including such changes and modifications as do not involve a departure from the spirit of the invention and the scope of the appended claim.

Having thus described my invention, I claim:

As a new article of manufacture, a thread protector consisting of a metallic shell having an inturned flange at one end, the axially extending wall of said shell being non-circular at the opposite end, said non-circular end being so shaped as to provide a plurality of circumferentially spaced outwardly convex lobes and portions intermediate said lobes which are closer than the lobes to the axis of the protector, a liner of relatively soft material for said axially extending wall, said intermediate portions of said wall having indentations formed therein for securing the liner thereto and to cause said non-circular end to be distorted into substantially circular form when the protector is applied to a threaded member, said indentations being spaced from the ends of the protector so as to provide a plain ring-like portion at the non-circular end of the protector which will press said liner tightly against the threads of said member throughout the circumference of such ring-like portion.

HERMAN A. UNKE.